(12) United States Patent
Ishida et al.

(10) Patent No.: US 10,608,566 B2
(45) Date of Patent: Mar. 31, 2020

(54) CONTROL APPARATUS FOR ROTARY ELECTRIC MACHINES

(71) Applicant: DENSO CORPORATION, Kariya, Aichi-pref. (JP)

(72) Inventors: Jun Ishida, Kariya (JP); Hideaki Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 126 days.

(21) Appl. No.: 15/746,531

(22) PCT Filed: Jul. 21, 2016

(86) PCT No.: PCT/JP2016/071334
§ 371 (c)(1),
(2) Date: Jan. 22, 2018

(87) PCT Pub. No.: WO2017/014249
PCT Pub. Date: Jan. 26, 2017

(65) Prior Publication Data
US 2018/0219503 A1  Aug. 2, 2018

(30) Foreign Application Priority Data
Jul. 21, 2015  (JP) .................. 2015-144177

(51) Int. Cl.
| | |
|---|---|
| *H02P 6/00* | (2016.01) |
| *H02P 21/05* | (2006.01) |
| *H02P 6/32* | (2016.01) |
| *H02P 6/08* | (2016.01) |
| *H02P 27/04* | (2016.01) |

(52) U.S. Cl.
CPC ............. *H02P 21/05* (2013.01); *H02P 6/08* (2013.01); *H02P 6/32* (2016.02); *H02P 27/04* (2013.01)

(58) Field of Classification Search
CPC .. H02P 21/05; H02P 27/04; H02P 6/08; H02P 6/32
See application file for complete search history.

(56) References Cited

U.S. PATENT DOCUMENTS

2014/0152205 A1*  6/2014  Nakai ............... H02P 21/05
                                                318/400.02
2015/0256095 A1*  9/2015  Ohta ................ H02M 7/4826
                                                363/37

FOREIGN PATENT DOCUMENTS

JP       2008-141838 A       6/2008

* cited by examiner

*Primary Examiner* — Muhammad S Islam
(74) *Attorney, Agent, or Firm* — Oliff PLC (57) ABSTRACT

A control apparatus for a rotary electric machine includes at least one of a first corrector and a second corrector. The first corrector corrects a first command voltage as a function of a deviation between a command value for a field current and an actual value of the field current. The second corrector corrects a second command voltage as a function of a deviation between a command value for a d-axis component of an armature current and an actual value of the d-axis component of the armature current. At least one of the first corrector and the second corrector makes the d-axis component of the armature current and the field current non-interfere with each other.

8 Claims, 7 Drawing Sheets

CONTROL APPARATUS FOR ROTARY ELECTRIC MACHINES

TECHNICAL FIELD

The present disclosure relates to control apparatuses for rotary electric machines; each of the control apparatuses is capable of generating torque in accordance with field magnetic flux generated by an energized field winding.

BACKGROUND

Control apparatuses for a synchronous rotary electric machine perform field-weakening control that aims to increase the rotational speed of the synchronous rotary electric machine while keeping torque of the synchronous rotary electric machine to a constant value. The field-weakening control decreases a d-axis current, which is flowing through an armature coil of the synchronous rotary electric machine.

In addition, control apparatuses for a wound-field rotary electric machine perform field flux control that aims to increase the torque of the wound-field rotary electric machine. The field flux control increases a field current, which is flowing through a field winding of the wound-field rotary electric machine, to thereby increase a magnetic field.

For example, a control apparatus for a wound-field rotary electric machine may perform both the field-weakening control and the field flux control. This changes the d-axis current, and the change of the d-axis current may result in a disturbance voltage being induced in the field winding due to magnetic coupling between the field winding and the armature coil. This disturbance voltage may cause the field current to fluctuate.

Similarly, execution of both the field-weakening control and the field flux control changes the field current, and the change of the field current may result in a disturbance voltage being induced in the armature coil. This disturbance voltage may cause the d-axis current to fluctuate.

These field-current and d-axis-current changes may result in torque of the wound-field rotary electric machine fluctuating. In particular, the inductances of field windings have been becoming lower in recent years in order to achieve higher torque response. This may cause fluctuations of the field current due to the disturbance voltage to have a significant impact on the torque of the wound-field rotary electric machine.

For reducing torque variations due to the disturbance voltage, a conventional control apparatus, which is disclosed in patent literature 1, is configured to correct a command value for the field current in accordance with the amount of change of the d-axis current.

CITATION LIST

Patent Literature

[Patent Literature 1] Japanese Patent Application Publication No. 2008-141838

SUMMARY

Technical Problem

Interference between the field current and the d-axis current acts on each of the field current and the d-axis current as a voltage disturbance. For this reason, the configuration of the conventional control apparatus, which corrects a command value for the field current, may have difficulty in causing a field voltage to follow a command value for the field voltage. This may make it difficult for the field current to follow the command value for the field current.

The present disclosure, which has been created in view of the above problem, mainly aims to provide control apparatuses for a rotary electric machine, each of which is capable of lowering the impact of disturbance due to an interference voltage, thus reducing fluctuations of each of a field current and a d-axis current.

Solution to Problem

A first exemplary configuration of the present disclosure is a control apparatus for a rotary electric machine that includes a rotor with a field winding, and a stator with an armature coil. The control apparatus controls an armature current flowing through the armature coil and a field current flowing through the field winding. The control apparatus includes a first command voltage setter configured to set a first command voltage based on a deviation between a command value for a d-axis component of the armature current and an actual value of the d-axis component of the armature current. The first command voltage is a command value for a d-axis component of an armature voltage to be applied to the armature coil. The control apparatus includes a second command voltage setter configured to set a second command voltage based on a deviation between a command value for the field current and an actual value of the field current. The second command voltage is a command value for a field voltage to be applied to the field winding. The control apparatus includes at least one of a first corrector and a second corrector. The first corrector is configured to correct the first command voltage as a function of the deviation between the command value for the field current and the actual value of the field current. The second corrector is configured to correct the second command voltage as a function of the deviation between the command value for the d-axis component of the armature current and the actual value of the d-axis component of the armature current. At least one of the first corrector and the second corrector is configured to make the d-axis component of the armature current and the field current non-interfere with each other.

The above configuration corrects the first command voltage as a function of a target value for the field current and an actual value of the field current, and corrects the second command voltage as a function of a target value for the d-axis component of the armature current and the actual value of the d-axis component of the armature current. Correction of the first command voltage or the second command voltage enables the field current and the armature current to not interfere with each other. That is, the above configuration, which does not correct the target value for the field current as disclosed in the conventional technology, but corrects the first command voltage and the second command voltage, results in suitably compensating for disturbance due to an interference voltage. This makes it possible to reduce fluctuations of the field current and a d-axis current even if there is large disturbance due to the interference voltage, resulting in reduction in torque variations of the rotary electric machine.

DESCRIPTION OF THE EMBODIMENTS

First Embodiment

The following describes the first embodiment in which a control apparatus according to the present disclosure is applied to a vehicle that has an engine as its in-vehicle main engine with reference to the accompanying drawings.

Figure 1:
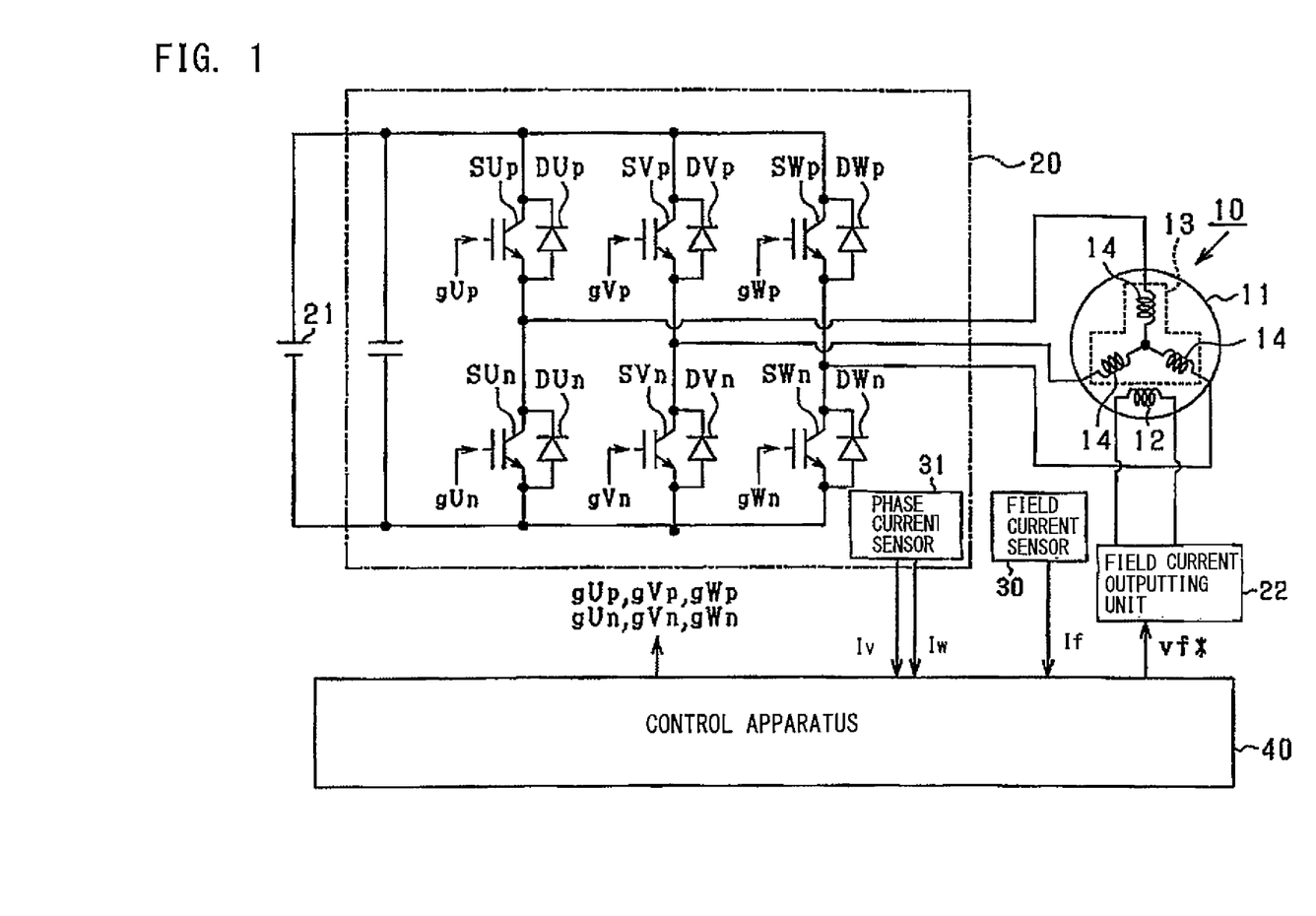
FIG. 1 is a diagram illustrating an electrical structure of the first embodiment of the present disclosure.

Referring to FIG. 1, a rotary electric machine 10 is designed as a wound-field rotary electric machine having multiphase windings, more specifically, as a wound-field synchronous motor having three-phase windings. The rotary electric machine 10 of the first embodiment serves as, for example, an integrated starter-generator (ISG) that serves as both a starter motor and an alternator. In particular, the rotary electric machine 10 serves as a starter in each of 1. A first case that initially cranks the engine
2. A second case that, while the engine is automatically stopped, performs an idle reduction function to automatically restart the engine upon predetermined restart conditions being satisfied A rotor 11, which constitutes the rotary electric machine 10, includes a field winding 12. The rotor 11 is coupled to the crankshaft of the engine such that power is transmittable between the rotor 11 and the crankshaft. In particular, the rotor 11 of the first embodiment is coupled, more specifically directly coupled, to the crankshaft via a belt. An armature coil 14 is wound in and around a stator 13 of the rotary electric machine 10.

An inverter 20 is connected to the armature coil 14 of the rotary electric machine 10, and a direct-current (DC) power source 21 is connected to the inverter 20.

The inverter 20 includes a first pair of series-connected high- and low-side switching elements SUp and SUn, a second pair of series-connected high- and low-side switching elements SVp and SVn, and a third pair of series-connected high- and low-side switching elements SWp and SWn. The connection point through which the switching elements SUp and SUn of the first pair are connected to each other in series is connected to a terminal of a U-phase winding of the armature coil 14. Similarly, the connection point through which the switching elements SVp and SVn of the second pair are connected to each other in series is connected to a terminal of a V-phase winding of the armature coil 14. Moreover, a connecting point through which the switching elements SWp and SWn of the third pair are connected to each other in series is connected to a terminal of a W-phase winding of the armature coil 14.

The first embodiment uses IGBTs as the respective switching elements SUp, SUn, SVp, SVn, SWp, and SWn.

Flywheel diodes DUp, DUn, DVp, DVn, DWp, and DWn are electrically connected in antiparallel to the respective switching elements SUp, SUn, SVp, SVn, SWp, and SWn.

MOSFETs can be used as the respective switching elements SUp, SUn, SVp, SVn, SWp, and SWn. If MOSFETs can be used as the respective switching elements SUp, SUn, SVp, SVn, SWp, and SWn, the intrinsic diodes of the MOSFETs can be used as the respective flywheel diodes.

The high-side terminal of the inverter 20, which is the collector-side terminal of each high-side switch, is connected to the positive terminal of the DC power source 21. The low-side terminal of the inverter 20, which is the emitter-side terminal of each low-side switch, is connected to the negative terminal of the DC power source 21.

A field current outputting unit 22 is capable of applying a DC voltage to a field winding 12. The field current outputting unit 22 adjusts a field voltage vf to be applied to the field winding 12 based on power supplied from the DC power source 21, thus controlling a field current if flowing through the field winding 12. As described above, the common DC power source 21 supplies electrical power to both the armature coil 14 and the field winding 12.

A control apparatus 40 obtains a measurement value of the field current If from a field current sensor 30. The control apparatus 40 calculates a field voltage command value vf* that is a command value for the field voltage vf to be applied to the field winding 12; the field voltage command value vf* serves as a manipulation value for feedback controlling the field current If to its command value If*.

The control apparatus 40 of the first embodiment performs proportional-integral control based on the deviation between an actual value of the field current If and the field current command value If* to correspondingly calculate the field voltage command value vf*.

The control apparatus 40 also calculates a d-axis current command value Id* and a q-axis current command value Iq* in accordance with a torque command value T* and a rotational angular velocity co of the rotary electric machine 10. The d-axis current command value Id* represents a command value for a d-axis current component of an armature current, and the q-axis current command value Iq* represents a command value for a q-axis current component of the armature current.

Figure 2:
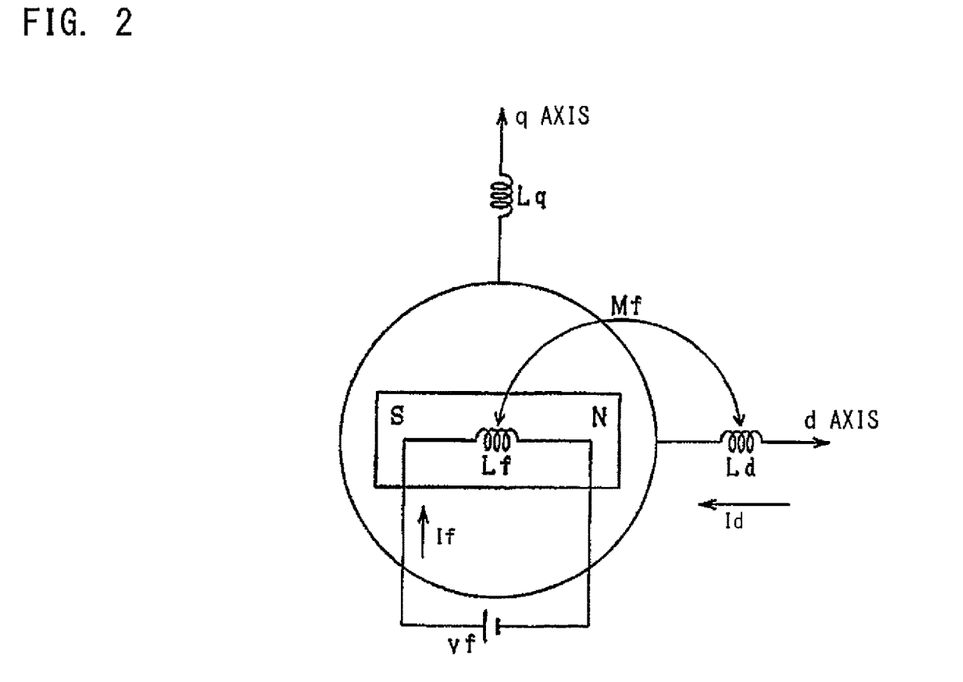
FIG. 2 is a diagram illustrating the interference between a d-axis current and a field current.

Note that the d-axis current Id and q-axis current Iq are components of a current vector, which consists of a d-axis current and q-axis current, on a rotating coordinate system defined in the rotor 11 constituting the rotary electric machine 10 (see FIG. 2).

For example, the d-axis is defined as the direction toward magnetic flux of the rotor 11, and the q-axis is defined as the direction that is electromagnetically perpendicular to the d-axis, i.e. as the direction leading in phase from the d-axis by $\pi/2$.

The control apparatus 40 generates, based on the d- and q-axis current command values Id* and Iq*, drive signals gUp, gUn, gVp, gVn, gWp, and gWn. More specifically, the control apparatus 40 calculates respective phase command voltages vu*, vv*, and vw* in accordance with the d- and q-axis current command values Id* and Iq* and measurement values of phase currents Iv and Iw obtained from a phase current sensor 31. Then, the control apparatus 40 performs a PWM task that compares in magnitude the command voltages vu*, vv*, and vw* with a carrier signal, such as a triangular signal, tp to accordingly generate the drive signals gUp, gUn, gVp, gVn, gWp, and gWn.

Thereafter, the control apparatus 40 outputs the generated drive signals gUp, gUn, gVp, gVn, gWp, and gWn to the inverter 20. This enables sinusoidal voltages, which have the phase differences of 120 electrical degrees therebetween, to be applied to the respective U-, V-, and W-phase windings of the armature coil 14. This results in sinusoidal U-, V-, and W-phase currents, which have the phase differences of 120 electrical degrees therebetween, to flow through the respective U-, V-, and W-phase windings of the armature coil 14.

Here is the equation (1) indicative of output torque T of the wound-field rotary electric machine 10:

$$T = Pn\{\phi a \cdot iq + (Ld - Lq)Id \cdot Tq\} \quad (1)$$

Where Pn denotes the number of pole pairs of the rotor 11, φa denotes field magnetic flux, Iq represents the q-axis current, Id represents the d-axis current, Ld represents a d-axis inductance, and Lq represents a q-axis inductance.

The magnitude of the d-axis inductance Ld and the magnitude of the q-axis inductance Lq in the wound-field rotary electric machine 10 can be regarded to be identical to each other, which is similar to those in a surface permanent magnet motor (SPM motor). For this reason, the output torque T can be expressed by the following equation (2):

$$T = Pn \cdot \phi a \cdot Iq \quad (2)$$

In the wound-field rotary electric machine 10, the following equation (3) is established:

$$\phi a = Mf \cdot If \quad (3)$$

Where Mf denotes the mutual inductance between the field winding 12 and the armature coil 14, and If denotes the field current.

The equation (3) enables the output torque T to be expressed by the following equation (4):

$$T = Pn \cdot Mf \cdot If \cdot Iq \quad (4)$$

That is, the rotary electric machine 10 properly adjusts the field current If and the q-axis current Iq to thereby control the output torque T.

FIG. 2 illustrates a dq axis model of the rotary electric machine 10. The field magnetic flux based on a self-inductance of the field winding 12 and d-axis magnetic flux based on the d-axis inductance Ld are generated to face each other. The mutual inductance between the field winding 12 and the armature coil 14 can be represented as Mf.

The following equation (5) shows a voltage equation of the wound-field rotary electric machine 10:

$$\begin{bmatrix} Vd \\ Vq \\ Vf \end{bmatrix} = \begin{bmatrix} R \cdot Id \\ R \cdot Iq \\ Rf \cdot If \end{bmatrix} + \begin{bmatrix} Ld & 0 & Mf \\ 0 & Lq & 0 \\ Mf & 0 & Lf \end{bmatrix} \begin{bmatrix} Id \\ Iq \\ If \end{bmatrix} + \omega \begin{bmatrix} 0 & -Lq & 0 \\ Ld & 0 & Mf \\ 0 & 0 & 0 \end{bmatrix} \begin{bmatrix} Id \\ Iq \\ If \end{bmatrix} \quad (5)$$

Where (1) of represents a voltage applied to the field winding 12

(2) Rf represents a field-winding resistance that is the resistance component of the field winding 12

(3) Lf represents a field-winding inductance that is the self-inductance of the field winding 12

(4) vd represents the d-axis voltage that is the d-axis component of the armature voltage (5) vq represents the q-axis voltage that is the q-axis component of the armature voltage (6) R represents the armature-coil resistance that is the resistance component of the armature coil 14

(7) Ld represents the d-axis inductance (8) Lq represents the q-axis inductance (9) ω represents the angular velocity of the rotor 11

(10) s represents a differential operator

Deformation of the equation (5) enables the field current If and the d-axis current Id to be expressed by the following equations:

$$If = (vf - s \cdot Mf \cdot Id)/(Lf \cdot s + Rf)$$

$$Id = (vd + \omega \cdot Lq \cdot Iq - s \cdot Mf \cdot If)/(Ld \cdot s + R)$$

In order to increase the rotational angular velocity ω, the control apparatus 40 performs so-called "field-weakening control" that increases the d-axis current Id in the negative direction.

An increase of the d-axis current Id in the negative direction enables the field current If to increase in the positive direction.

In addition, in order to increase the output torque T, the control apparatus 40 increases the field current If in the positive direction.

An increase of the field current If in the positive direction enables the d-axis current Id to increase in the negative direction.

Japanese Patent Application Publication No. 2008-141838 discloses, as a conventional technology, a configuration that corrects a command value If* for the field current If in accordance with the amount of change of the d-axis current Id.

Interference between the field current If and the d-axis current Id acts on each of the field current If and the d-axis current Id as a voltage disturbance for the field voltage vf that is the output voltage of the field current outputting unit 22. For this reason, the configuration of the conventional technology, which corrects the field-current command value If*, may have difficulty in causing the field voltage vf to follow a command value vf* for the field voltage vf. This may make it difficult for the field current If to follow field-current command value If*.

In view of these circumstances, the control apparatus 40 according to the first embodiment is configured to make the d-axis current Id and the field current If non-interfere with each other using an inverse model of the rotary electric machine 10.

Figure 3:
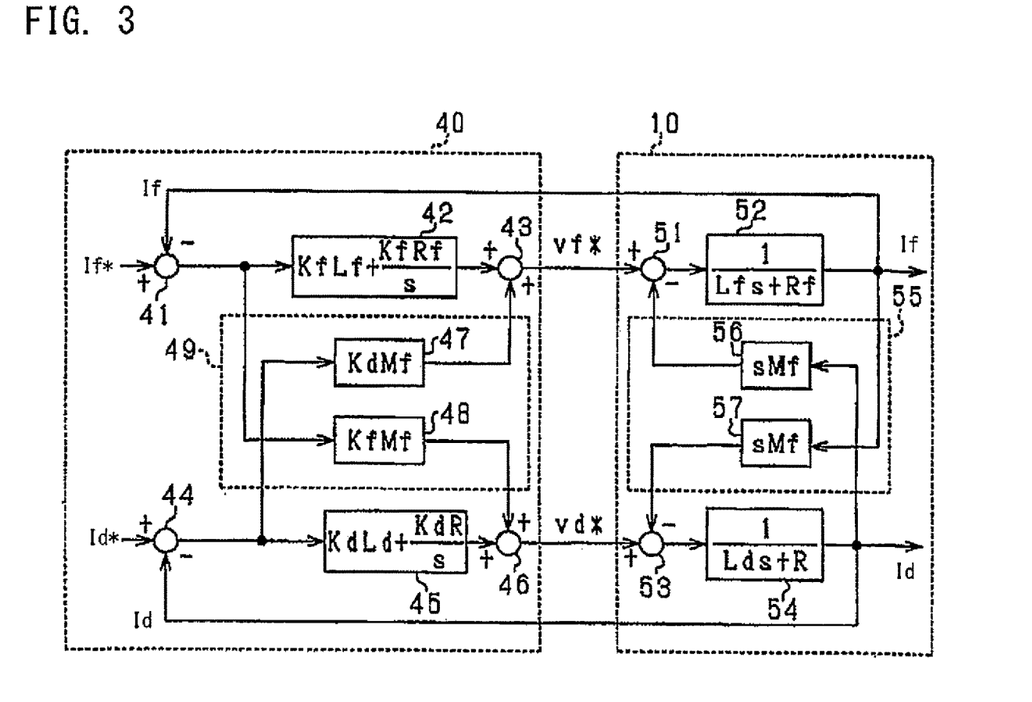
FIG. 3 is a model diagram illustrating a control apparatus and a rotary electric machine according to the first embodiment.

The right side of FIG. 3 illustrates a model diagram of the rotary electric machine 10 as a controlled target, i.e. a controlled plant. Note that, in FIG. 3, the d-axis current Id and the field current If are only illustrated in order to model the interference between the d-axis current Id and the field current If, and therefore the q-axis current Iq, i.e. the interference between the d-axis current Id and the q-axis current Iq is omitted in illustration in FIG. 3.

Specifically, the modeled rotary electric machine 10 includes an interference unit 51, a first-order lag element 52, an interference unit 53, and an interference voltage generator 55. The interference voltage generator 55 is comprised of differentiating elements 56 and 57.

To the rotary electric machine 10, a d-axis voltage command value vd* and the field voltage command value vf are input.

To the interference unit 51, the field voltage command value vf* and an interference voltage s·Mf·Id are input. The interference voltage represents an output value of the differentiating element 56, which is represented by (s·Mf), upon the actual value Id of the d-axis current being input to the differentiating element 56.

The voltage, which is represented by (vf*−s·Mf·Id), output from the interference unit 51 is input to the first-order lag element 52, which is represented by $$\frac{1}{Lfs + Rf},$$

i.e. input to the admittance of the field winding 12, so that the actual value of the field current If, which is expressed by the following equation (6), is output from the first-order lag element 52:

$$If = (vf - s \cdot Mf \cdot Id)/(Lf \cdot s + Rf) \quad (6)$$

To the interference unit 53, the d-axis voltage command value vd* and an interference voltage s·Mf·If are input. The interference voltage represents an output value of the differentiating element 57, which is represented by (s·Mf), upon the actual value If of the field current being input to the differentiating element 57.

The voltage, which is represented by (vd*−s·Mf·If), output from the interference unit 53 is input to the first-order lag element 54, which is represented by $$\frac{1}{Lds + R},$$

i.e. input to the admittance of the d-axis, so that the actual value of the d-axis voltage vd, which is expressed by the following equation (7), is output from the first-order lag element 54:

$$Id = (vd - s \cdot Mf \cdot If)/(Ld \cdot s + R) \quad (7)$$

In the rotary electric machine 10 illustrated in FIG. 3, the interference voltage generator 55, which is comprised of the differentiating elements 56 and 57, causes an interference voltage between the d-axis current Id and the field current If to be generated.

The left side of FIG. 3 illustrates an inverse model of the rotary electric machine 10; the inverse model is installed in the control apparatus 40. The inverse model includes a deviation calculator 41, a PI operator 42, an anti-interference unit 43, a deviation calculator 44, a PI operator 45, an anti-interference unit 46, a proportional element 47, and a proportional element 48.

The deviation calculator 41 calculates the deviation ΔIf of the actual value If of the field current from the command value If* for the field current. The PI operator 42 performs a proportional-integral (PI) operation using the deviation ΔIf. Specifically, the PI operator 42 performs, as the PI operation, the sum of a proportional element (Kf·If) and an integral element $$\left(\frac{Kf \cdot Rf}{s}\right);$$

Kf represents an integral gain.

The output of the PI operator 42 corresponds to a field voltage command value vf* without including an interference voltage Δvf. The anti-interference unit 43 calculates the sum of the output of the PI operator 42 and the interference voltage Δvf, and outputs the sum of the output of the PI operator 42 and the interference voltage Δvf as a non-interference field voltage vf*. That is, the anti-interference unit 43 corrects the field voltage command value vf*. Note that inputting a d-axis current deviation did described later into the proportional element (Kf·Mf) 47 enables the interference voltage Δvf to be calculated.

The deviation calculator 44 calculates the deviation ΔId of the actual value Id of the d-axis current from the command value Id* for the d-axis current. The PI operator 45 performs a PI operation using the deviation ΔId. Specifically, the PI operator 45 performs, as the PI operation, the sum of a proportional element (Kd·Ld) and an integral element $$\left(\frac{Kd \cdot R}{s}\right);$$

Kd represents an integral gain.

The output of the PI operator 45 corresponds to a d-axis voltage command value vd* without including an interference voltage Δvd. The anti-interference unit 46 calculates the sum of the output of the PI operator 45 and the interference voltage Δvd, and outputs the sum of the output of the PI operator 45 and the interference voltage Δvd as a non-interference d-axis voltage vd*. That is, the anti-interference unit 46 corrects the d-axis voltage command value vd*. Note that inputting the field-current deviation ΔIf into the proportional element (Kf·Mf) 48 enables the interference voltage Δvd to be calculated.

The PI operator 45 according to the first embodiment corresponds to a first command voltage setter, and the PI operator 42 corresponds to a second command voltage setter. The proportional element 48 and the anti-interference unit 46 correspond to a first corrector, and the proportional element 47 and the anti-interference unit 43 correspond to the first corrector. The d-axis voltage command value vd* corresponds to a first command voltage, and the field voltage command value vf* corresponds to a second command voltage, In addition, the first embodiment is configured such that an interference voltage calculator 49, which is comprised of the proportional elements 47 and 48, calculates the interference voltages Δvf and Δvd. As described above, making the d-axis current Id and the field current If non-interfere with each other in the first embodiment enables the overall control system to be handled as a first-order lag system.

Figure 4:
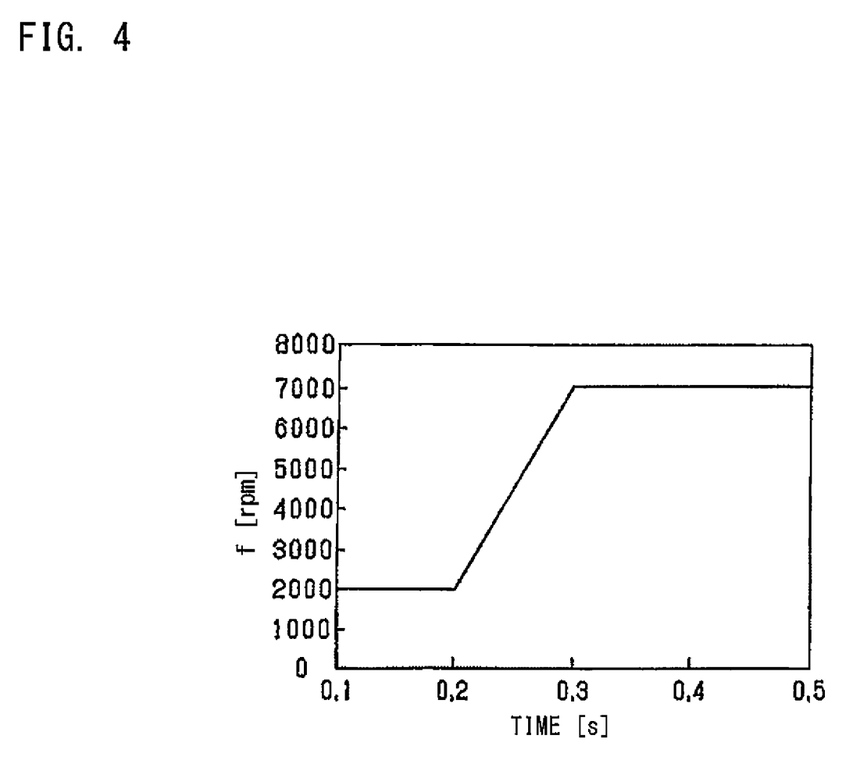
FIG. 4 is a timing chart illustrating change of the rotational speed of the rotary electric machine illustrated in FIG. 1.
Figure 5:
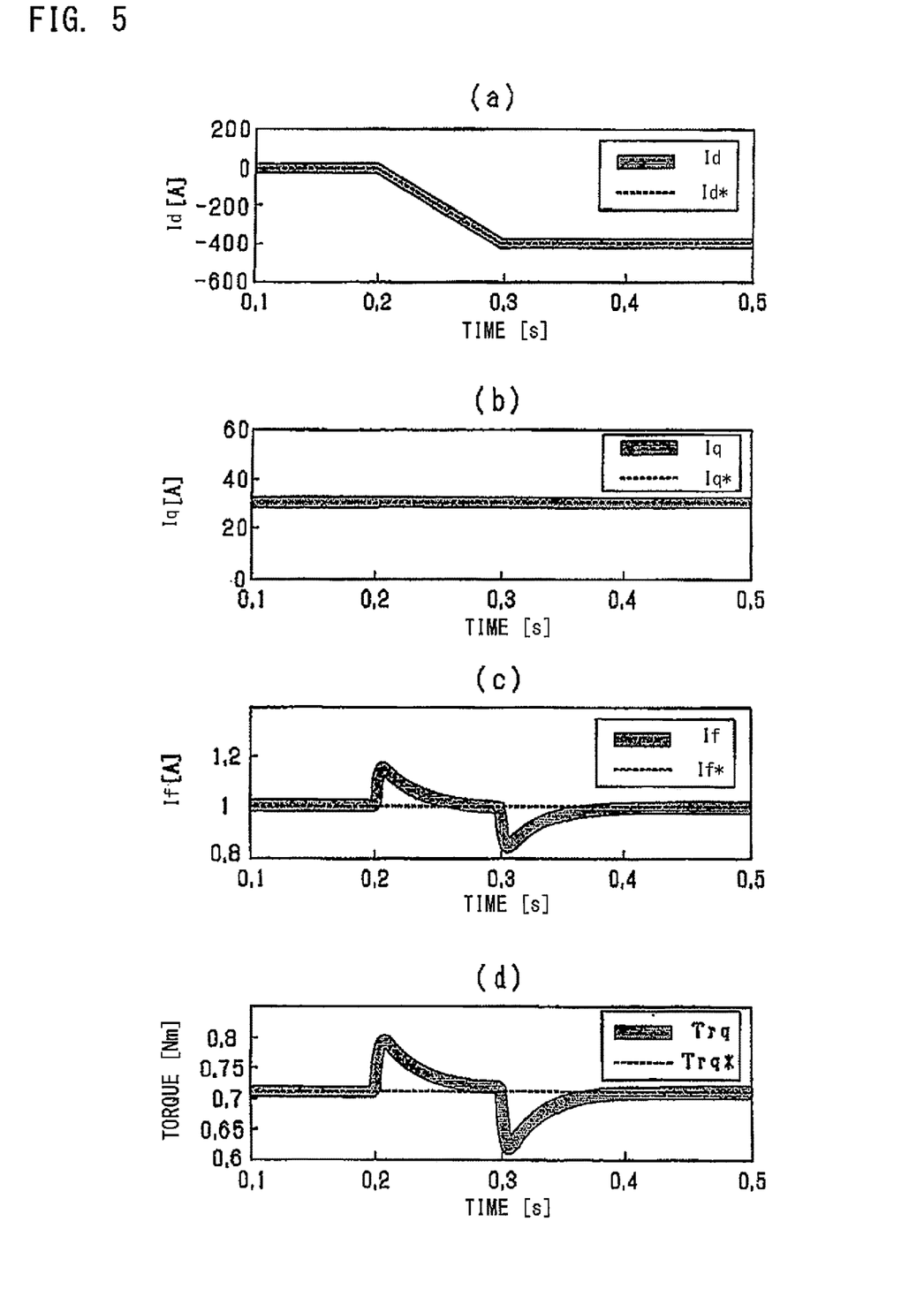
FIG. 5 is a timing chart illustrating how a d-axis current, a q-axis current, a field current, and torque of the rotary electric machine are changed in a case where no non-interference control is carried out.
Figure 6:
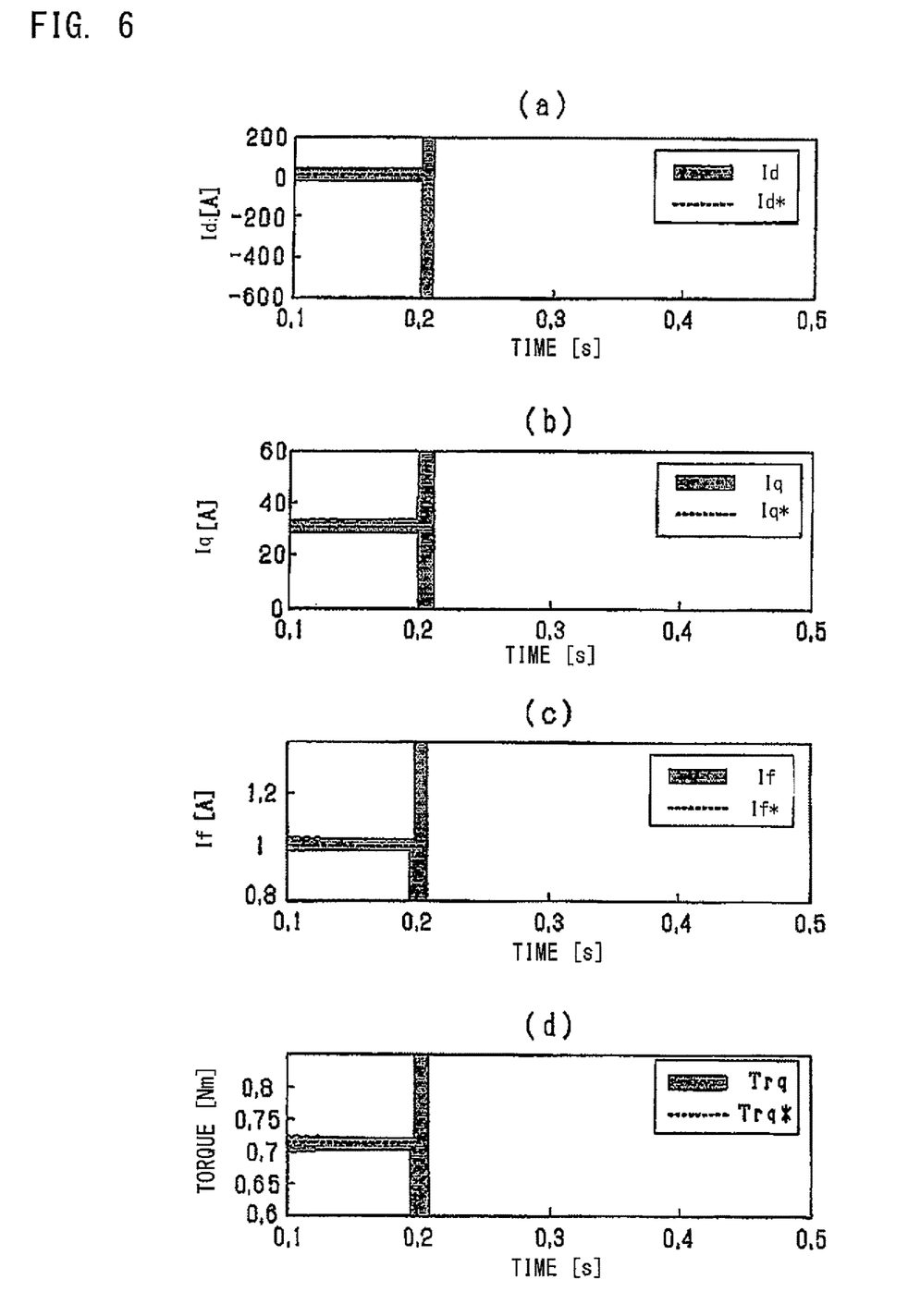
FIG. 6 is a timing chart illustrating how a d-axis current, a q-axis current, a field current, and torque of the rotary electric machine are changed in a case where non-interference control disclosed in the conventional technology is carried out.
Figure 7:
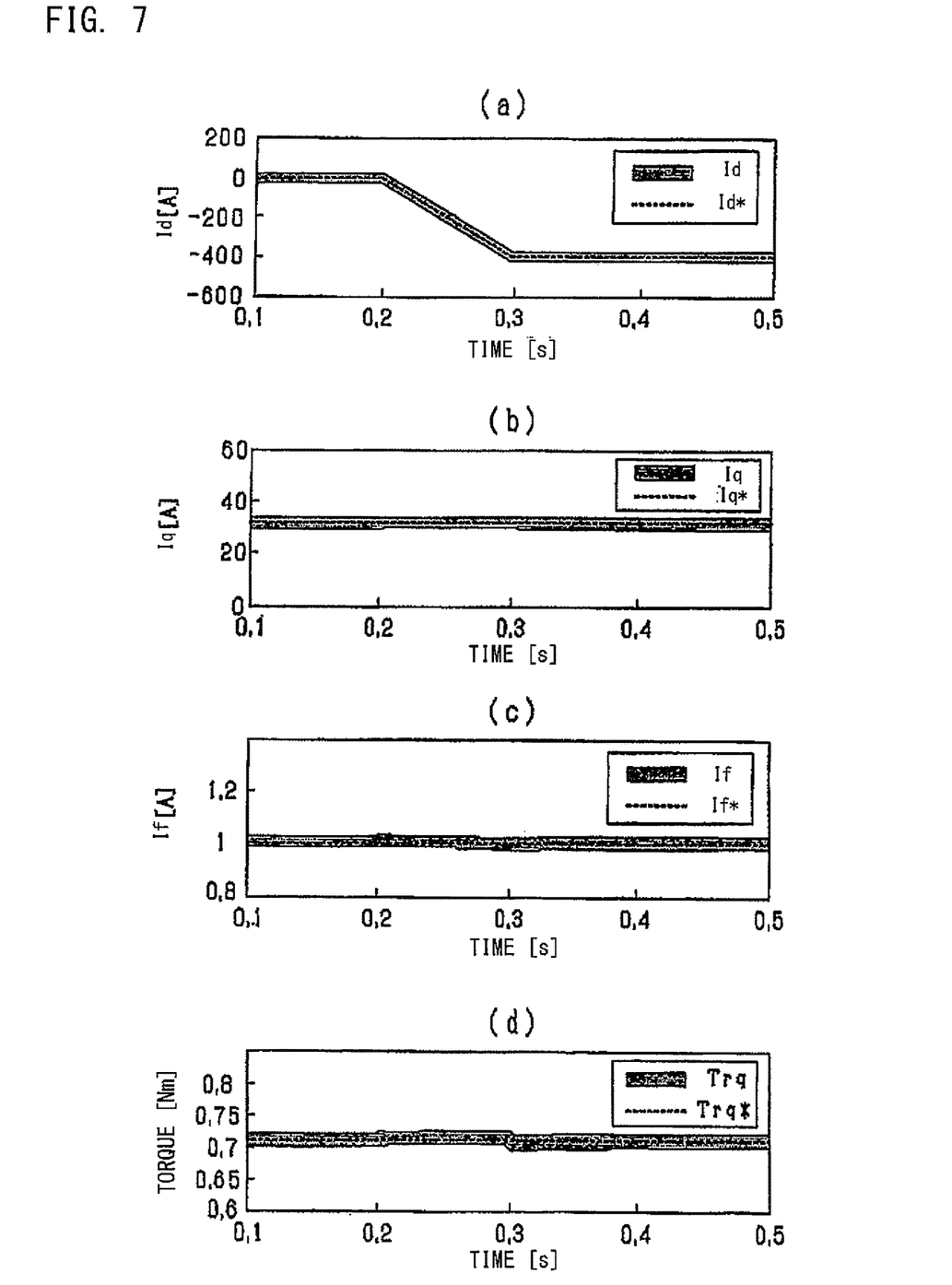
FIG. 7 is a timing chart illustrating how a d-axis current, a q-axis current, a field current, and torque of the rotary electric machine are changed in a case where non-interference control according to the first embodiment is carried out.

Under the situation where the rotational speed f, which is represented by f=ω/2π, increases from 2000 [rpm] to 7000 [rpm] during a predetermined period of, for example, 0.1 seconds (s) (see FIG. 4), how the d-axis current Id, the q-axis current Iq, the field current If, and the torque T are changed as illustrated in each of FIGS. 5 to 7.

Specifically, FIG. 5 illustrates how the d-axis current Id, the q-axis current Iq, the field current If, and the torque T are changed in a case where no non-interference tasks are carried out. FIG. 6 illustrates how the d-axis current Id, the q-axis current Iq, the field current If, and the torque T are changed in a case where the non-interference task disclosed in the conventional technology of Japanese Patent Application Publication No. 2008-141838 is carried out.

In contrast, FIG. 7 illustrates how the d-axis current Id, the q-axis current Iq, the field current If, and the torque T are changed in a case where the non-interference task according to the first embodiment is carried out.

The case where no anti-interference tasks are carried out, which is illustrated in FIG. 5, shows that the d-axis current Id increases in the negative direction with an increase of the rotational speed f (see reference character (a) of the FIG. 5). Change of the field current If causes the field current If to fluctuate (see reference character (c) of FIG. 5), resulting in the torque fluctuating (see reference character (d) of FIG. 5).

The case where the non-interference task disclosed in the conventional technology is carried out, which is illustrated in FIG. 6, shows the failure of control at the beginning of the control (see the change of the d-axis current Id).

In contrast, the case where the non-interference task according to the first embodiment is carried out, which is illustrated in FIG. 7, shows that fluctuations of the field current Ic are reduced independently of change of the d-axis current Id. This results in fluctuations of the torque being reduced.

The following describes the advantageous effects obtained by the control apparatus 40 according to the first embodiment.

The control apparatus 40 is configured not to correct the field-current command value If* as described in the conventional technology, but to correct the field-voltage command value vf* and the d-axis voltage command value vd*. This configuration makes it possible to suitably compensate for disturbance due to the interference voltages Δvf and Δvd, enabling fluctuations of the field current If and the d-axis current Id to be reduced. This results in reduction of torque variations.

More specifically, the control apparatus 40 is configured to multiply the deviation ΔId between the actual value Id of the d-axis current and the command value Id* for the d-axis current by the coefficient (Kd·Md) to correspondingly calculate a correction amount, i.e. the interference voltage, for the field voltage command value vf*. This enables the interference voltage to be calculated by the simpler configuration.

Similarly, the control apparatus 40 is configured to multiply the deviation ΔIf between the actual value If of the field current and the command value If* for the field current by the coefficient (Kf·Mf) to correspondingly calculate a correction amount, i.e. the interference voltage, for the d-axis voltage command value vd*. This enables the interference voltage to be calculated by the simpler configuration.

Second Embodiment

Figure 8:
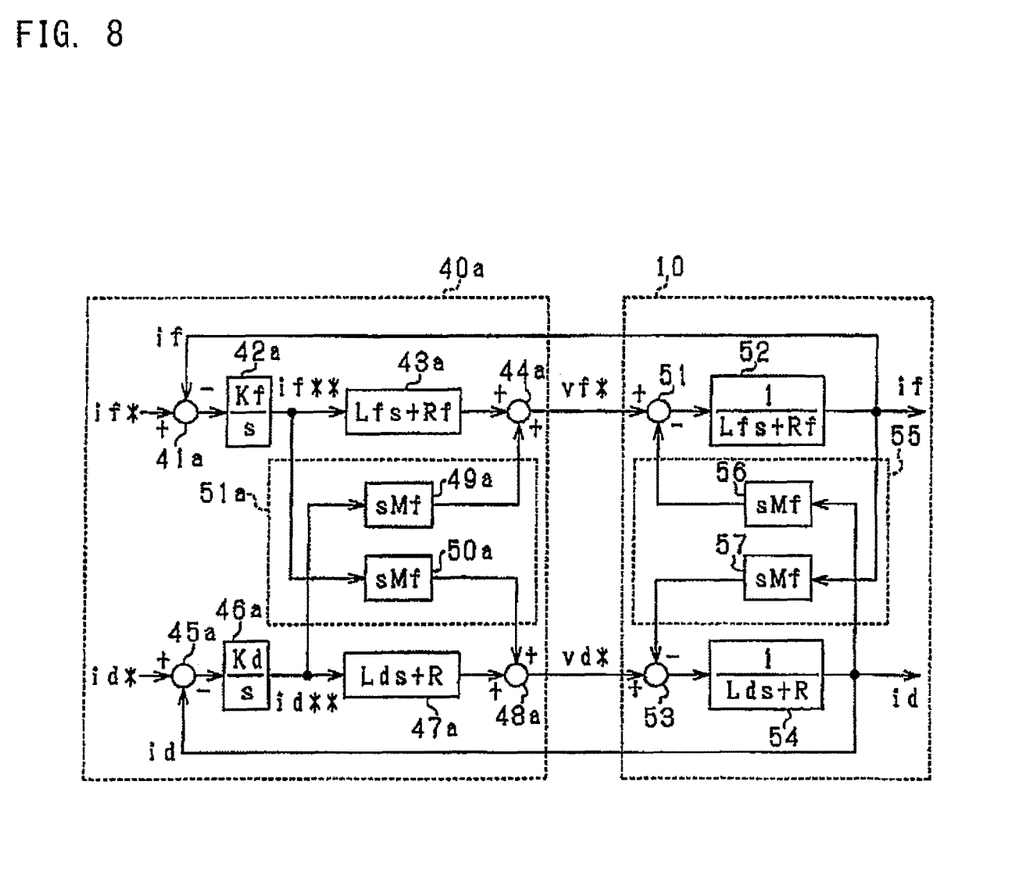
FIG. 8 is a model diagram illustrating a control apparatus according to the second embodiment of the present disclosure.

FIG. 8 illustrates an inverse model of the rotary electric machine 10; the inverse model is included in a control apparatus 40a.

The inverse model includes a deviation calculator 41a, a manipulated-variable calculator 42a, a differentiating element 43a, an anti-interference unit 44a, a deviation calculator 45a, a manipulated-variable calculator 46a, a differentiating element 47a, and an anti-interference unit 48a.

The deviation calculator 41a calculates the deviation ΔIf of the actual value If of the field current from the command value If* for the field current. The manipulated-variable calculator 42a, which serves as a second manipulated-variable calculator, performs integration of the deviation ΔIf to thereby calculate a current manipulated variable If serving as a second manipulated variable. Specifically, the manipulated-variable calculator 42a can serve as a first-order lag element represented by Kf/s where Kf represents an integral gain. The current manipulated variable If is input to the differentiating element 43a, which is represented by (Ifs+Rf). The differentiating element 43a represents the impedance of the field winding 12, and also represents the inverse of the first-order lag element 52 of the rotary electric machine 10.

The output of the differentiating element 43a corresponds to a field voltage command value vf* without including an interference voltage Δvf. The anti-interference unit 44a calculates the sum of the output of the differentiating element 43a and the interference voltage Δvf, and outputs the sum of the output of the differentiating element 43a and the interference voltage Δvf as a non-interference field voltage vf. Note that inputting a d-axis current manipulated variable Id** described later into the differentiating element (sMf) 49a enables the interference voltage Δvf to be calculated.

The deviation calculator 45a calculates the deviation ΔId of the actual value Id of the d-axis current from the command value Id* for the d-axis current. The manipulated-variable calculator 46a, which serves as a first manipulated-variable calculator, performs integration of the deviation ΔId to thereby calculate a current manipulated variable Id serving as a first manipulated variable. Specifically, the manipulated-variable calculator 45a can serve as a first-order lag element represented by Kd/s where Kd represents an integral gain. The current manipulated variable Id is input to the differentiating element 47a, which is represented by (Lds+Rd). The differentiating element 47a represents the d-axis impedance of the armature coil 14, and also represents the inverse of the first-order lag element 54 of the rotary electric machine 10.

The output of the differentiating element 47a corresponds to a d-axis voltage command value vd* without including an interference voltage Δvd. The anti-interference unit 48a calculates the sum of the output of the differentiating element 47a and the interference voltage Δvd, and outputs the sum of the output of the differentiating element 47a and the interference voltage Δvd as a non-interference d-axis voltage vd*. Note that inputting the field-current manipulated variable If* into the differentiating element (sMf) 50a enables the interference voltage Δvd to be calculated.

The manipulated-variable calculator 46a and the differentiating element 47a according to the second embodiment correspond to the first command voltage setter, and the manipulated-variable calculator 42a and the differentiating element 43a correspond to the second command voltage setter. The differentiating element 50a and the anti-interference unit 48a correspond to the first corrector, and the differentiating element 49a and the anti-interference unit 44a correspond to the second corrector.

In addition, the second embodiment is configured such that an interference voltage calculator 51a, which is comprised of the differentiating elements 49a and 50a, calculates the interference voltages Δvf and Δvd.

Equivalently transforming the inverse model of the rotary electric machine 10 installed in the control apparatus 40 of the first embodiment enables the inverse model of the rotary electric machine 10 installed in the control apparatus 40a of the second embodiment to be obtained.

The control apparatus 40a configured according to the second embodiment calculates, as a function of the deviation ΔId between the command value Id* for the d-axis current and the actual value Id of the d-axis current, the d-axis current manipulated variable Id that serves as a manipulated variable of the d-axis current Id. Then, the control apparatus 40a calculates, as a function of the d-axis current manipulated variable Id, a correction amount, i.e. the interference voltage, for the field voltage command value vf*. In particular, because the manipulated-variable calculator 46a performs integration of the deviation ΔId, the manipulated-variable calculator 46*a* serves as a low-pass filter. For this reason, the control apparatus 40*a*, which calculates, based on the d-axis current manipulated variable Id*, the correction amount for the field voltage command value vf*, enables influences due to noise in the d-axis current Id to be reduced.

Similarly, the control apparatus 40*a* calculates, as a function of the deviation ΔIf between the command value If* for the field current and the actual value If of the field current, the field current manipulated variable If that serves as a manipulated variable of the field current If. Then, the control apparatus 40***a* calculates, as a function of the field current manipulated variable If**, a correction amount, i.e. the interference voltage, for the d-axis voltage command value vd*. In particular, because the manipulated-variable calculator 42*a* performs integration of the deviation ΔIf, the manipulated-variable calculator 42*a* serves as a low-pass filter. For this reason, the control apparatus 40*a*, which calculates, based on the field current manipulated variable If*, the correction amount for the d-axis voltage command value vd*, enables the influence of noise on the field current If to be reduced.

MODIFICATIONS

Each of the controllers 40 and 40*a* can be configured to correct one of the d-axis voltage command value vd* and the field voltage command value vf*. For example, the control apparatus 40 according to the first embodiment can be configured such that either the set of the anti-interference unit 43 and the proportional element 47 or the set of the anti-interference unit 46 and the proportional element 48 is omitted.

The rotor 11 of the rotary electric machine 10 can be equipped with permanent magnets in addition to the field winding.

This application is based on and claims the benefit of priority from Japanese Patent Application 2015-144177, the disclosure of which is incorporated in its entirety herein by reference.

REFERENCE SIGNS LIST

10 Rotary electric machine
11 Rotor
12 Field winding
13 Stator
14 Armature coil
40 Controller
42 PI operator
43 Anti-interference unit
45 PI operator
46 Anti-interference unit
47, 48 Proportional element
42*a* Manipulated-variable calculator
43*a* Differentiating element
44*a* Anti-interference unit
46*a* Manipulated-variable calculator
47*a* Differentiating element
48*a* Anti-interference unit
49*a* Differentiating element
50*a* Differentiating element

The invention claimed is:

1. A control apparatus for a rotary electric machine that includes a rotor with a field winding, and a stator with an armature coil, the control apparatus controlling an armature current flowing through the armature coil and a field current flowing through the field winding, the control apparatus comprising:
    a first command voltage setter configured to set a first command voltage based on a deviation between a command value for a d-axis component of the armature current and an actual value of the d-axis component of the armature current, the first command voltage being a command value for a d-axis component of an armature voltage applied to the armature coil;
    a second command voltage setter configured to set a second command voltage based on a deviation between a command value for the field current and an actual value of the field current, the second command voltage being a command value for a field voltage applied to the field winding; and
    at least one of a first corrector and a second corrector,
    the first corrector being configured to correct the first command voltage as a function of the deviation between the command value for the field current and the actual value of the field current,
    the second corrector being configured to correct the second command voltage as a function of the deviation between the command value for the d-axis component of the armature current and the actual value of the d-axis component of the armature current,
    at least one of the first corrector and the second corrector being configured to make the d-axis component of the armature current and the field current non-interfere with each other.

2. The control apparatus according to claim 1, wherein the second corrector is configured to multiply, by a coefficient, the deviation between the command value for the d-axis component of the armature current and the actual value of the d-axis component of the armature current to correspondingly calculate a correction amount for the second command voltage.

3. The control apparatus according to claim 1, wherein the first corrector is configured to multiply, by a coefficient, the deviation between the command value for the field current and the actual value of the field current to correspondingly calculate a correction amount for the first command voltage.

4. The control apparatus according to claim 1, wherein:
    the first command voltage setter comprises a first manipulated-variable calculator configured to calculate a first manipulated variable as a function of the deviation between the command value for the d-axis component of the armature current and the actual value of the d-axis component of the armature current, the first manipulated variable being a manipulated variable of the d-axis component of the armature current,
    the first command voltage setter being configured to set the first command voltage as a function of the first manipulated variable; and
    the second corrector is configured to calculate a correction amount for the second command voltage as a function of the first manipulated variable.

5. The control apparatus according to claim 4, wherein:
    the first manipulated-variable calculator is configured to perform integration of the deviation between the command value for the d-axis component of the armature current and the actual value of the d-axis component of the armature current to thereby calculate the first manipulated variable; and the second corrector is configured to perform differentiation of the first manipulated variable to thereby calculate the correction amount for the second command voltage.

6. The control apparatus according to claim 1, wherein:

the second command voltage setter comprises a second manipulated-variable calculator configured to calculate a second manipulated variable as a function of the deviation between the command value for the field current and the actual value of the field current, the second manipulated variable being a manipulated variable of the field current, the second command voltage setter being configured to set the second command voltage as a function of the second manipulated variable; and the first corrector is configured to calculate a correction amount for the first command voltage as a function of the second manipulated variable.

7. The control apparatus according to claim 6, wherein:

the second manipulated-variable calculator is configured to perform integration of the deviation between the command value for the field current and the actual value of the field current to thereby calculate the second manipulated variable; and the first corrector is configured to perform differentiation of the second manipulated variable to thereby calculate the correction amount for the first command voltage.

8. The control apparatus according to claim 1, wherein:

each of the first and second correctors is configured to correct a corresponding one of the first command voltage and the second command voltage as a function of a mutual inductance between the field winding and the d-axis component of the armature coil.

* * * * *